March 6, 1951   B. G. LANGE ET AL   2,544,032
BUOYANCY SCALE
Filed July 22, 1946   3 Sheets-Sheet 1
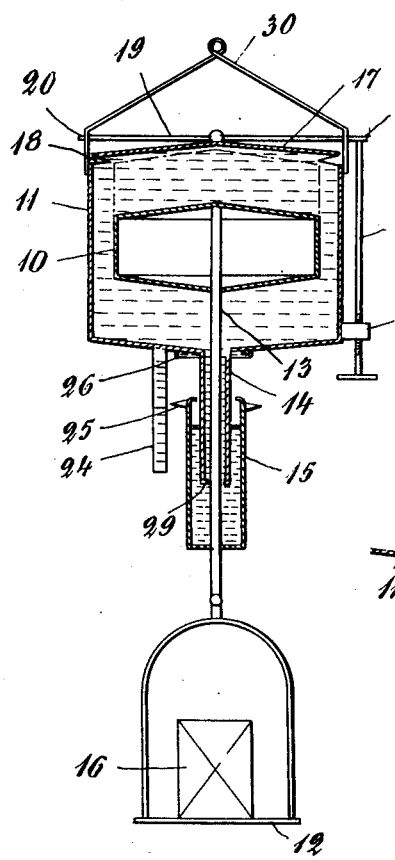
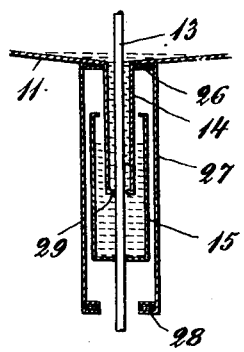
Inventor
Bror Gunnar Lange
Karl Henrik Lange
By: Henry C. Parker   Attorney.

March 6, 1951   B. G. LANGE ET AL   2,544,032
BUOYANCY SCALE
Filed July 22, 1946   3 Sheets-Sheet 2

Inventors:
Bror Gunnar Lange
Karl Henrik Lange
By: Henry C. Parker
Attorney.

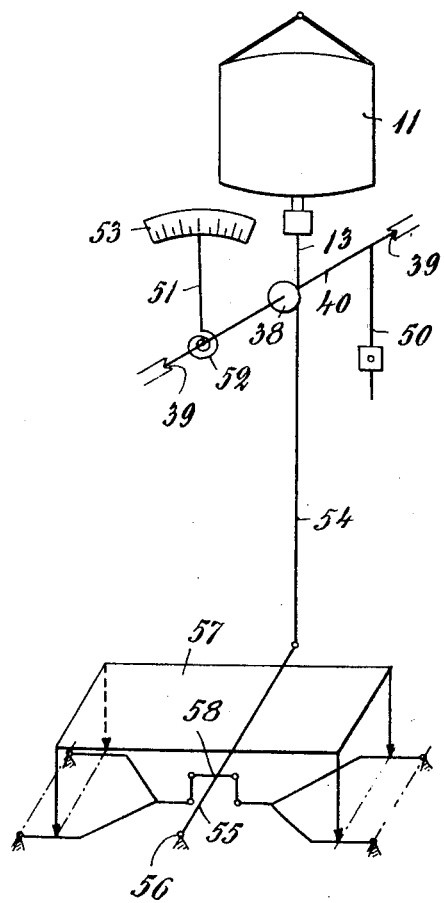

Patented Mar. 6, 1951

2,544,032

UNITED STATES PATENT OFFICE 2,544,032

BUOYANCY SCALE

Bror Gunnar Lange, Jonkoping, and Karl Henrik Lange, Stockholm, Sweden

Application July 22, 1946, Serial No. 685,415
In Sweden April 6, 1945

8 Claims. (Cl. 265—43)

1

The present invention relates to hydrostatic balances. More particularly it relates to such hydrostatic balances of tolerance, in which the float system is composed of a float, which in its entirely submerged position counterbalances the major part of the weight to be controlled, and of an only partly submerged auxiliary displacement element serving to counterbalance the difference between the actual weight and the buoyancy of the float, said displacement element having a relatively small horizontal cross-sectional area so that small deviations from the standard weight will manifest themselves through a considerable change of the depth to which the displacement element is submerged in the liquid.

It is a primary object of the present invention to improve, by a suitable and simple construction, the arrangement of the known hydrostatic balances of the kind set forth so as to eliminate entirely or to a very great extent mechanical friction between solid parts, thereby increasing the accuracy of the balance so as to make it particularly suitable for tolerance measurements.

Another important object of the invention is to provide a hydrostatic balance having a main float and a displacement element in which the time required for the balance to reach its equilibrium is reduced to a minimum.

Other objects and advantages of the invention will be clear from the following detailed description of suitable embodiments with reference to the accompanying drawings.

In the drawings:

Figure 1 is a vertical axial section of a simple embodiment of the invention comprising a scale pan suspended directly from the float.

Figure 2 is a vertical section on a larger scale through the displacement element and adjacent parts in a balance according to Figure 1 provided with a dust protector.

Figure 4 shows diagrammatically a modification of the combined hydrostatic and mechanical balance illustrated in Figure 3.

Figure 3:
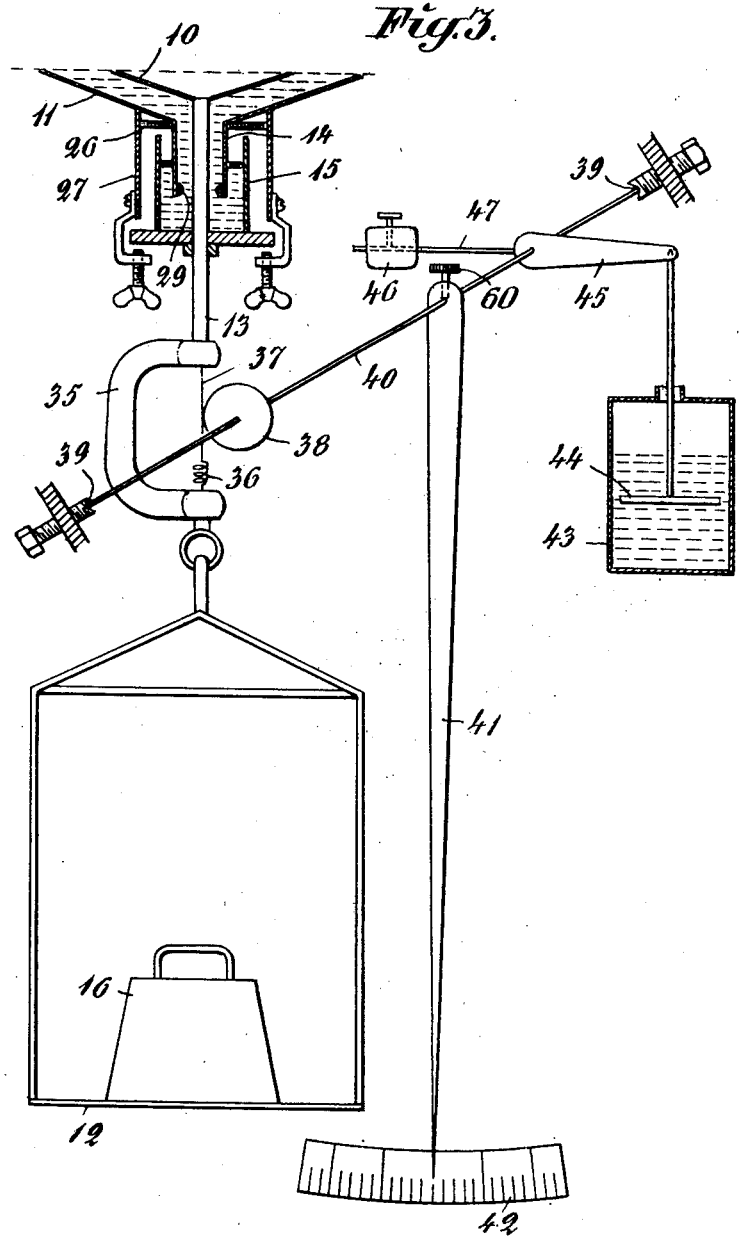
Figure 3 shows somewhat diagrammatically the combination of a hydrostatic balance and an auxiliary mechanical balance.

In the hydrostatic balance illustrated in Figure 1 the reference numeral 10 designates the float and the refernce numeral 11 a closed vessel which is entirely filled with liquid and wherein the float is arranged. The float 10 is connected with a scale pan 12 through the intermediary of a rod-shaped carrying member 13, which projects through a depending bottom tube 14 the lower mouth of which dips down into a quantity of liq-

2 uid contained in an open cup 15 which together with the scale pan 12 is carried by the rod 13. The liquid in the cup 15 on the one hand forms a liquid seal, which prevents air from entering the closed vessel 11, and on the other hand serves to exert an upwardly directed pressure on the bottom tube 14 dipping down thereinto, said pressure being proportional to the length of the tube which is submerged below the free surface of liquid in the cup. The bottom tube 14 thus serves as a displacement element the buoyancy of which influences the movable system in the opposite direction to that of the float 10.

When loading the scale pan 12 with a sufficiently large weight 16, the float 10 will sink from its upper limit position indicated with dotted lines to a floating position between the cover and the bottom of the vessel, the free surface of liquid in the cup 15 sinking at the same time with respect to the displacement element 14, with the result that the downward pressure on the movable system from the displacement element is reduced. Equilibrium is reached when the difference between the constant buoyancy of the float 10 and the variable buoyancy of the displacement element 14 corresponds exactly to the weight of the float and the parts carried thereby. Said weight is, however, not exactly constant during the movement of the system, in that when the float 10 is lowered a portion of the carrying rod 13 will leave the liquid-filled vessel 11 thus reducing the volume of the liquid displaced from the vessel, so that a corresponding quantity of liquid has to be sucked up in the vessel from the open cup 15. In this manner a corresponding reduction of the total weight carried by the float 10 is obtained, on account of the simultaneous lowering of the level of the liquid in the cup also a reduction of the downwardly directed pressure from the displacement element 14 which counteracts the buoyancy of the float. Also said phenomenon thus involves a reduction, on the lowering of the scale pan, of the downwardly directed forces acting on the float, although of a smaller order of magnitude, and causes a slight reduction of the distance which the scale pan has to move before equilibrium is reached.

Since in the hydrostatic balance or scale just described there is no friction between solid parts, it is evident that it is possible to obtain every degree of sensitiveness of the balance by making the bottom tube 14 and the rod 13 sufficiently narrow.

An arbitrary selection of material for the hydrostatic balance will evidently make the same somewhat dependent upon the temperature of the surroundings. According to a further development of the invention the balance may be made independent of the temperature by selecting such a material for the float and a liquid of such kind that the float and the liquid will be subjected to the same changes of volume on changes in temperature. As a material for the float hard rubber may be used and as a liquid a suitable mixture of water and glucose.

A coarse adaptation to different temperatures may be obtained e. g. by designing the vessel with an arbitrarily variable volume. For this purpose the cover 17 of the vessel 11 may be connected with the cylindrical wall of the vessel by means of a wall portion 18 formed as a bellows and be connected at its centre with a lever 19, which at one end 20 is fulcrumed at the rigid wall portion of the vessel and at its other end 21 rests on the end of an adjusting screw 22 which passes through a threaded hole in a bracket 23 on the rigid wall of the vessel. When the screw 22 is turned in one direction, the cover 17 is lifted through the intermediary of the lever 19, whereby the volume of the vessel is increased, with the result that a quantity of liquid is sucked into the vessel from the cup 15 causing the float 10 to rise, whereas if the screw is turned in the opposite direction, the volume of the vessel is reduced and a corresponding lowering of the float is obtained. The movements of the float are indicated on a stationary graduated scale 24 over which an annular pointer 25 on the cup 15 moves.

When calibrating the balance by means of the volume adjusting device described above an ordinary weight having the desired weight value is placed on the scale pan 12, whereupon the screw 22 is turned in the proper direction until the pointer 25 is positioned right opposite the normal graduation line on the scale 24. As soon as the temperature of the surroundings changes again, the scale must be calibrated anew. An automatic temperature compensation of the balance in accordance with the changes of temperature may be obtained, however, by making the rod 22 of a material of a suitable coefficient of thermal expansion, said rod being inserted between the bracket 23 and the end 21 of the lever 19.

According to Figure 1, the cup 15 is arranged to engage at its upper edge with a sealing surface 26 on the underside of the vessel 11, when the balance is unloaded, whereby dust is prevented from entering the cup during the periods of rest. As a protection against dust during the weighing periods a separate dust protector may be provided, e. g. designed in the manner shown in Figure 2. Said dust protector consists of a sleeve 27 depending from the bottom of the vessel 11 and embracing the cup 15 with a certain clearance. The protecting sleeve 27 should preferably be detachably secured to the bottom of the vessel so that it can be removed readily when it is desired to gain access to the interior of the cup 15, e. g. for the purpose of filling new liquid into the cup. The protecting sleeve 27 may be provided at its lower end with a sealing surface 28, which when the balance is arrested co-operates with the bottom of the cup 15. As a protection against the evaporation of the liquid in the cup 15 the free surface of the liquid may be covered by a floating layer of oil or other non-evaporable liquid.

The displacement element 14 may be provided on the inside of its lower mouth with spacer elements 29 which are intended to prevent the rod 13 from adhering to the tube. Said spacer elements do not reach the rod, however, when the latter is hanging straight down.

The scale of tolerance illustrated in Figure 1 is adapted to be suspended in a ceiling and is provided for this purpose with a suspending yoke 30. For arresting the scale pan there may be provided an arresting device, which grips over the scale pan 12 and which upon removal of the load retains the scale pan in its normal position. In this manner the time required for carrying out a weight controlling operation is reduced.

As has already been pointed out hydrostatic balances of the kind described above operate very accurately, because the mechanical friction between solid parts may be made very small or even be entirely eliminated, but they require a comparatively long time before the system comes to rest, which in certain cases is inconvenient. In order to reduce the time required for a hydrostatic balance to reach its equilibrium after the load has been applied on the balance, the hydrostatic balance may be combined, according to the invention, with a double-acting auxiliary balance which cooperates in such a manner with the float system that the same, upon a displacement from its normal position corresponding to the standard weight, introduces a counter-force which together with the counter-force set up on account of the changed buoyancy of the displacement element counteracts displacements of the system from its normal position and thus causes the float system to come to rest after a smaller vertical movement from said position and thus after the lapse of a shorter time than would otherwise have been the case.

Since in hydrostatic balances combined with such an auxiliary balance the float system carries by far the greater part of the load, whereas the auxiliary balance only has to counterbalance a weight which is equal to or even smaller than the difference between the actual weight and the standard weight, the auxiliary balance may advantageously be made as a mechanical balance. Under these conditions the friction in the bearing surfaces of the mechanical balance will be entirely without importance and without practical influence on the accuracy of the measurements, whereas through the possibility of designing mechanical balances so as to give clear readings for very small displacements of the load, it is rendered possible through the use of such balances to reduce the time required for the movable system of the hydrostatic balance to come to rest to one tenth of the earlier value or less.

Referring now in Figure 3, there is inserted between the carrying rod 13 secured to the float 10 and the scale pan 12 a yoke 35, between the arms of which there is secured under tension from a spring 36 a flexible filament 37. Said filament is carried around a wheel 38 fixed on a horizontal shaft 40 which is journalled in adjustable bearings 39. On the shaft 40 there is also secured a pointer 41, which in the normal position of the balance assumes a vertical depending position and which on the turning of the shaft 40 moves over a fixed graduated scale 42. For damping the turning movement of the shaft 40 there is provided a piston 44 movable in a cylinder 43 filled with liquid, said piston being suspended from the free end of an arm 45 secured to the shaft 40. The weight of the arm 45 and the piston 44 is counterbalanced by a counterweight 46 displaceably arranged on an arm 47.

If there is placed on the scale pan 12 an object 16, the weight of which exactly corresponds to the weight for which the balance of tolerance is calibrated, i. e. the standard weight, the different parts will take up the normal position shown in the drawing in which the pointer 41 is hanging straight down so that it does not exert any turning moment on the shaft 40 because of its weight. If an additional very small weight is then placed on the pan 12, the pan will move downwardly from its normal position, causing on the one hand through the simultaneous lowering of the open cup 15 the downwardly directed pressure from the displacement element 14 to be reduced, and on the other hand the pointer or pendulum 41 to deflect towards the right, so that under the action of gravity the latter will exert a turning moment on the shaft 40 which is transmitted through the wheel 38 and the filament 37 as an upwardly directed force to the movable system of the hydrostatic balance. Equilibrium is obtained when the sum of the upwardly directed force caused by the deflection of the pointer and the reduction of the downwardly directed force caused by the reduced buoyancy of the displacement element 14 is equal to the weight of the additional load. By selecting a suitable graduation for the scale 42 it will evidently be possible to read directly on the scale said additional weight or difference in weight from the predetermined value.

The pointer 41 may, if desired, be arranged turnable on the shaft 40 and be provided with a locking screw 60 or the like by means of which it may be locked on the shaft in an exactly vertical position after a calibrating weight 16 has been placed on the scale pan. Alternatively, a calibration of the combined hydrostatic and mechanical balance according to Figure 3 can be effected in the manner described in connection with Figure 1.

The sleeve 14 operating as a displacement element may, if desired, be made with a very small diameter, e. g. with the smallest diameter consistent with a sufficient mechanical strength of the carrying rod 13 embraced by the sleeve, whereby the contribution of the displacement element to the weight equalization may become almost negligible. On the other hand, it is possible, when desired, to increase the part taken by the displacement element in the equalization of the weight by increasing its diameter.

Figure 4 illustrates a modified arrangement of a pendulum type auxiliary balance. The pendulum proper 50 is fixed to the horizontal shaft 40, if desired adjustably by means of a locking screw, not shown, whereas a separate pointer 51, is provided that moves over a graduated scale 53. In order to compensate automatically for temperature variations, said pointer 51 is secured to the shaft through the intermediary of a bi-metallic spiral 52 which turns the pointer with respect to the shaft through an adequate angle when a change in temperature occurs.

Figure 4 also indicates how a hydrostatic balance according to the invention may be used as a counterbalancing mechanism in a platform type weighing machine. The load placed on the platform 57 is transmitted through a known system of levers to a point 58 on a single-armed lever 55 fulcrummed in the frame at point 56, the carrying rod 13 of the hydrostatic balance being connected through the intermediary of a vertical link 54 to the free end of said lever 55.

The invention is of course not restricted to the specific embodiments shown and described above but further modifications are conceivable without receding from the idea of the invention.

We claim:

1. A hydrostatic balance particularly adapted to measure tolerances which comprises a float chamber completely filled with liquid, means for supporting said chamber, a tubular displacement member depending from said chamber and forming an extension thereof, a float disposed in said float chamber and displacing the liquid in said chamber, a scale pan, means for suspending said scale pan attached to said float and passing through said tubular displacement member, said float, suspending means and scale pan constituting the movable system of said balance, and a cup-shaped member at least partly filled with liquid, open at the top and mounted on said suspending means beneath the float chamber, which cup-shaped member is in open communication with the liquid in said float chamber through said displacement member, said displacement member having its end extending beneath the level of the liquid in said cup-shaped member, and means for indicating the height of said movable system thereby affording relative readings of weight.

2. The device of claim 1 in which a sealing surface is provided on the underside of the float chamber to cooperate with the upper edge of the cup-shaped member thereby sealing the liquid therein from the air.

3. The device of claim 1 in which a dust protector is provided for the cup, said dust protector comprising a tubular member depending from the bottom of the float chamber and surrounding the cup-shaped member.

4. The device of claim 3 including sealing means at the lower end of said tubular dust protector adapted to cooperate with the bottom of the cup-shaped member.

5. The device of claim 1 in which spacer elements are provided at the lower end of the displacement member to prevent the suspending means from adhering to the displacement member.

6. The device of claim 1 wherein the displacement element has a relatively small cross-sectional area in comparison to that of the float.

7. A hydrostatic balance particularly adapted to measure tolerances which comprises a float chamber completely filled with liquid and having an expansible top, means for supporting said chamber, a tubular displacement member depending from said chamber and forming an extension thereof, a float disposed in said float chamber and displacing the liquid in said chamber, a scale pan, means for suspending said scale pan attached to said float and passing through said tubular displacement member, said float, suspending means and scale pan constituting the movable system of said balance, and a cup-shaped member at least partly filled with liquid, open at the top and mounted on said suspending means beneath the float chamber, which cup-shaped member is in open communication with the liquid in said float chamber through said displacement member, said displacement member having its end extending beneath the level of the liquid in said cup-shaped member, means for indicating the height of said movable system thereby affording relative readings of weight, and means for changing the volume of the float chamber to compensate the weight readings of the balance for changes in temperature comprising a thermo-responsive rod mounted on the outside of the float chamber connected at one end to said expansible top and at the other end being attached to the side of said float chamber.

8. A hydrostatic balance for measuring differences between a standard weight and the weights of articles to be weighed comprising a float chamber completely filled with liquid, means for supporting said chamber, a tubular displacement member depending from said chamber and forming an extension thereof, a float disposed in said float chamber and displacing the liquid in said chamber, a scale pan, means for suspending said scale pan attached to said float and passing through said tubular displacement member, said float, suspending means and scale pan constituting the movable system of said balance, and a cup-shaped member at least partly filled with liquid open at the top and mounted on said suspending means beneath the float chamber, which cup-shaped member is in open communication with the liquid in said float chamber through said displacement member, said displacement member having its end extending beneath the level of liquid in said cup-shaped member, an auxiliary double acting balancing device directly coupled to said movable system to counterbalance at least part of the difference between the actual weight of the load and the standard weight and means for indicating the height of said movable system thereby affording relative readings of weight.

BROR GUNNAR LANGE.
KARL HENRIK LANGE.

REFERENCES CITED

The following references are of record in the file of this patent:

UNITED STATES PATENTS

| Number | Name | Date |
|---|---|---|
| Re. 17,728 | Burningham et al. | July 15, 1930 |
| 903,083 | Hapgood | Nov. 3, 1908 |
| 1,199,687 | Gephardt | Sept. 26, 1916 |
| 1,604,387 | Caldwell | Oct. 26, 1926 |
| 1,880,436 | Haskins | Oct. 4, 1932 |
| 2,212,586 | Chuy | Aug. 27, 1940 |
| 2,462,216 | Nowak | Feb. 27, 1949 |

FOREIGN PATENTS

| Number | Country | Date |
|---|---|---|
| 74,648 | Switzerland | Apr. 2, 1917 |